Patented June 26, 1934

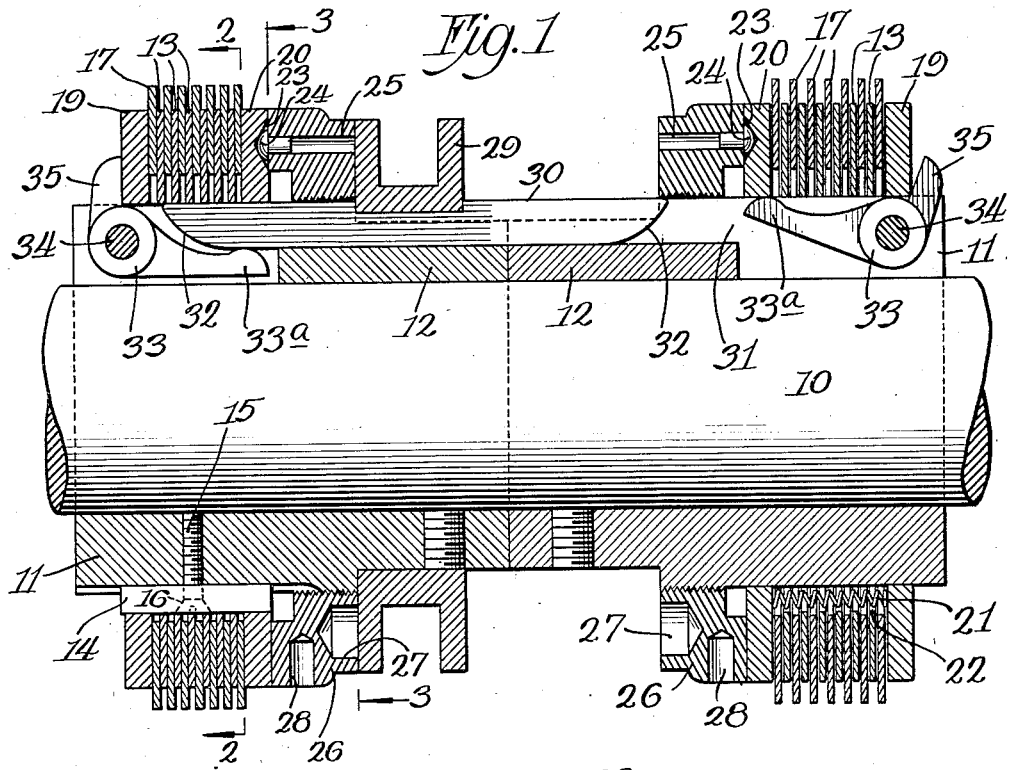
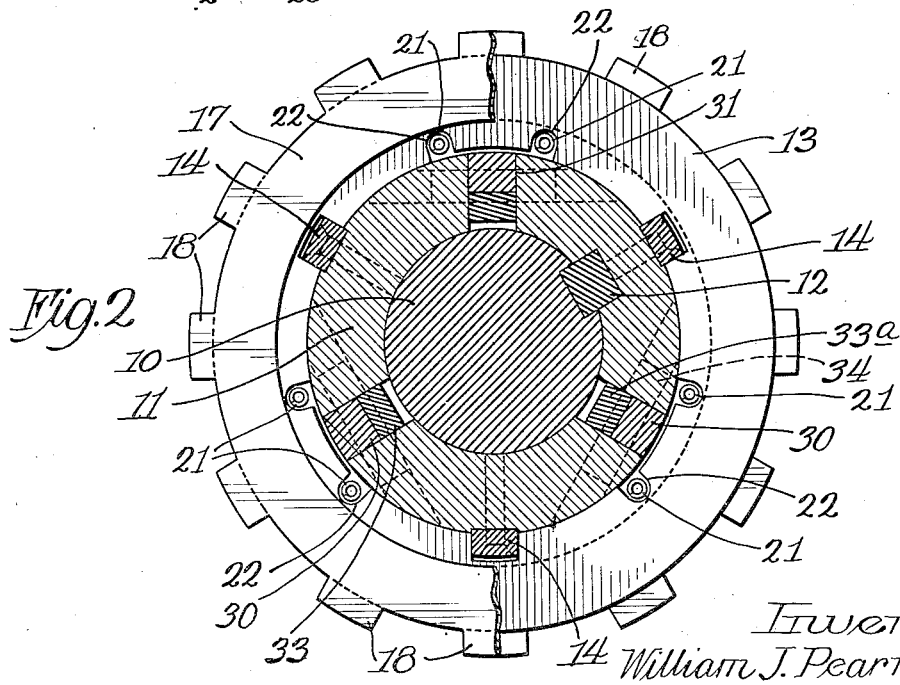

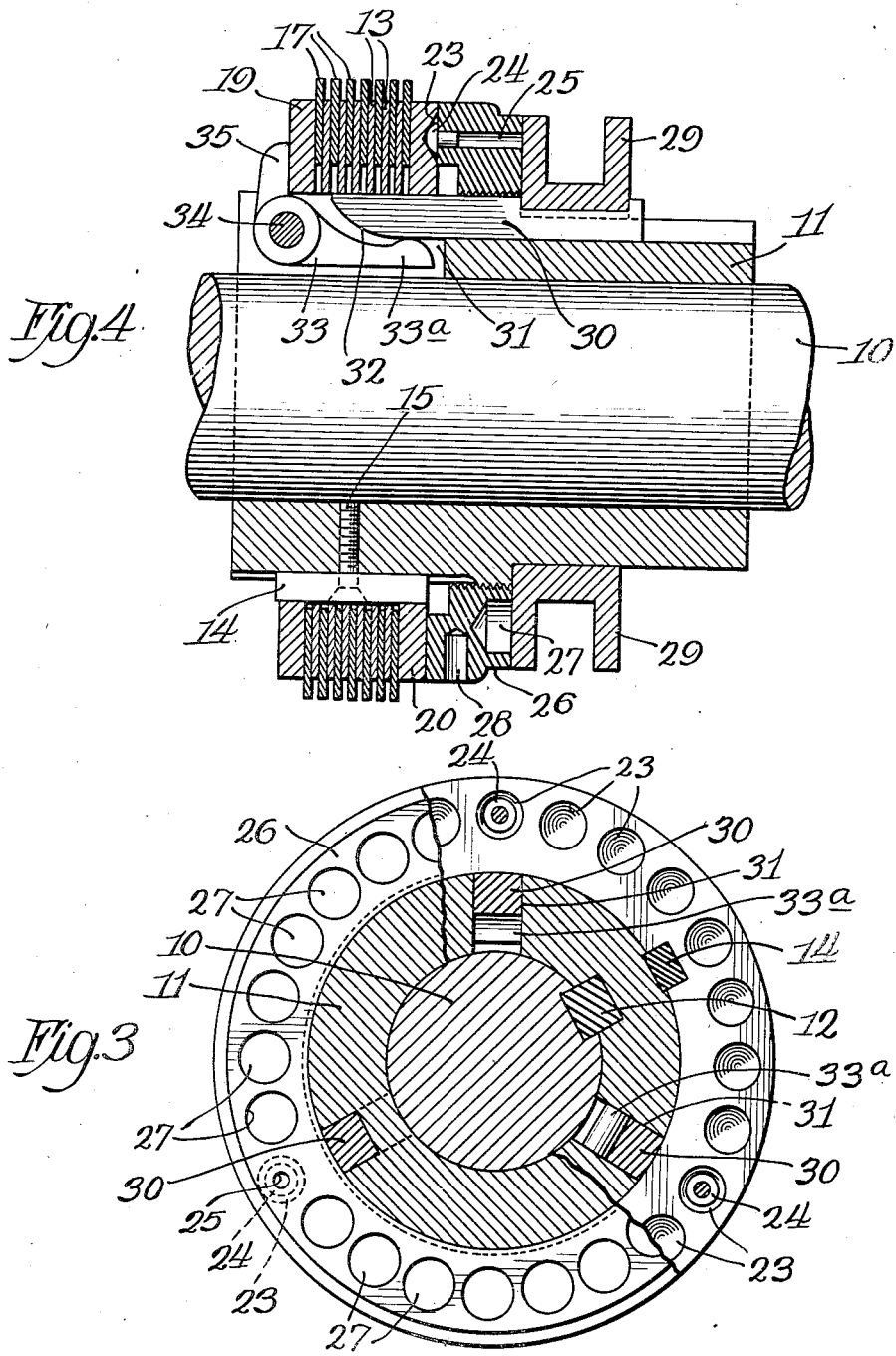

1,964,479

UNITED STATES PATENT OFFICE 1,964,479

CLUTCH

William J. Pearmain, Racine, Wis., assignor to The Twin Disc Clutch Company, Racine, Wis., a corporation of Wisconsin Application March 1, 1930, Serial No. 432,283

9 Claims. (Cl. 192—69)

My invention relates to clutches and more particularly to those types employing multiple discs for effecting a transmission of power between driving and driven members, although the essential conception of the invention is readily adaptable for use in other operating environments.

One object of my invention is to provide a multiple disc clutch in which the several discs are moved into driving engagement by a novel construction including members, operating on the principle of the wedge, which are characterized by a capacity for exerting the required pressure although functioning within a restricted space.

A further object is to provide a clutch of the character described in which the adjusting member thereof is locked in any predetermined position against the effect of inertia or momentum by the continuously acting pressure of the clutch release spring operating through parts engageable with said member.

A further object is to devise a clutch which is characterized by compactness in construction, a relatively small diameter for any given capacity, an absence of long, springy, lever arms, and by features of general design whose advantages are reflected in low manufacturing and assembling costs.

Other objects of the invention will become more apparent from the following specification, reference being had to the accompanying drawings, and the novel means by which said objects are effectuated will be definitely pointed out in the claims.

In the drawings:

Figure 1 is a sectional elevation of one form of my improved clutch construction showing a dual arrangement of clutches which may be used to effect changes in speed or a reversal in rotation of the driven member.

Figs. 2 and 3 are sections along the lines 2—2 and 3—3, respectively, in Fig. 1, looking in the direction of the arrows.

Fig. 4 is a view similar to Fig. 1, but showing a form of construction employing only a single clutch.

Referring to Fig. 1, the numeral 10 designates a shaft constituting one of the rotary parts and which, for purpose of illustration, will be denoted as the driven member of the clutch.

A pair of clutch hubs 11 is secured to the shaft 10 by means of keys 12, said hubs being placed in abutting relation, as shown clearly in Fig. 1, and adjacent the opposite, outer ends of said hubs are mounted the clutch constructions which are identical in every respect. Accordingly, but one type of construction will be described, reference hereinafter being made to the left hand hub 11, as viewed in Fig. 1.

A plurality of friction, driven discs 13 is secured to the hub 11 by means of a plurality of keys 14 circumferentially disposed in equispaced relation around said hub, three keys being shown in Fig. 2. The discs 13 are arranged for axial movement on said keys and endwise movement of the keys 14 is prevented by means of screws 15 which are passed therethrough for threaded engagement with said hub, the heads of said screws being flush with the outer face of said keys through being countersunk therein, as shown by the numeral 16 in Fig. 1. Alternately disposed with reference to the discs 13 is a plurality of friction driving discs 17 having a plurality of circumferentially disposed teeth 18 for driving engagement with a second rotary part, which will be denoted as the driving member of the clutch, said part not being shown in the drawings.

The discs 17 are also arranged for axial movement and the two sets of discs 13 and 17 are forced into frictional, driving engagement by means of a pair of clamping members constituted by the floating plate 19 and the lock plate 20, the former contacting with the outer face of the group of discs and the latter with the inner face, as viewed in Fig. 1, both of said plates being secured to the hub 11 by the keys 14 so far as motion of rotation is concerned. The plates 19 and 20 are actuated to clamp the discs 13 and 17 by a mechanism hereinafter described and are retracted to a released position by a plurality of springs 21, circumferentially disposed around the periphery of the hub 11 and which operate within recesses 22 provided in the discs 13, the ends of said springs abutting at all times, whether in driving or released position, against the opposed, inner faces of the plates 19 and 20.

In addition to serving as a clamping member for the two groups of discs, the lock plate 20 also functions to maintain the adjusting member of the clutch in any predetermined position. To this end, the inner face of the plate 20, as viewed in Fig. 1, is provided with a plurality of conical depressions 23 appropriately spaced around said face and certain of which receive the rounded heads of lock pins 24, the shanks of which are mounted in holes 25 provided in an adjusting ring 26 which is threaded on the hub 11. At this juncture, it will be recalled that the springs 21 always exert pressure against the lock plate and therefore always maintain said plate against the coacting face of the adjusting ring 26 for a purpose hereinafter explained. The ring 26 may be provided with a plurality of circumferentially disposed holes 27, drilled from the inner face of said ring for the purpose of lightening the same, and also with one or more holes 28 extending inwardly from the periphery of said ring to receive a suitable tool for turning said ring to any adjusted position.

As a means of actuating the clutch parts to driving position, a shifting collar 29, which may be moved by a suitable fork, not shown, is carried on a plurality of slides 30, of which three are shown in Fig. 2, which reciprocate in axial directions in channels 31 cut inwardly from the periphery of the hub 11. In the construction shown in Fig. 1, the slides 30 are sufficiently long to partially ride within the channels 31 which are provided in the right hand hub 11, both of said hubs being in abutting relation as above described. The ends of slides 30 are rounded as at 32 to define cam surfaces having the profile substantially of a wedge and said wedge shaped cams are intended to actuate at each end thereof the rounded ends on arms 33ª on bell crank levers 33 which are pivotally mounted on the hubs 11 by means of pins 34. Considering the left hub 11, these levers are equispaced around the shaft 10, three being shown in Fig. 2, and the other arm 35 of each lever actuates the floating plate 19 when each slide 30 occupies the position shown in Fig. 1.

In operation, it is contemplated that the driving discs 17 on the left hand hub 11 will be connected to a suitable driving member, which will be characterized by one condition of operation as regards direction of rotation and speed of rotation, while the discs 17 on the right hand hub 11 will be driven by a second member which may be characterized either by a motion of rotation opposite to that being applied to the discs 17 on the left hand hub 11, or by motion of rotation in the same direction, but at different speed. Accordingly, by this dual type of clutch construction, the shaft 10 may be subjected to reversals of rotation as desired, or it may be subjected to changes in rotatory speed, dependent upon the character of the driving members which actuate the respective driving discs 17.

Assuming that the clutch effects reversals in the motion of rotation of the shaft 10, it will be obvious from an inspection of Fig 1 that one of the clutches is now in driving engagement with the other clutch in released position, due to the free action of the springs 21. If it is then desired to effect a reversal of this condition, the shifting collar 29 will be moved toward the right, as viewed in Fig. 1, thereby moving each of the slides 30 in the same direction, to move each of the arms 33ª of the right hand set of bell crank levers toward the axis of the shaft 10, owing to the wedging action of the rounded ends of the slides 30. This movement of the levers actuates each of the arms 35 thereof in a counterclockwise direction, as viewed in Fig. 1, to move the floating plate 19 toward the lock plate 20 and effectually gripping the discs 13 and 17 therebetween in frictional, driving engagement, against the compression of the springs 21. During this operation at the right hand end of the clutch construction, the bell crank levers 33 at the opposite end will assume the positions shown by the corresponding levers at the right end of the structure, prior to shifting of the collar 29. Due to centrifugal action and under the expanding force of the springs 21, the floating plate 19 is moved outwardly in an axial direction until the rounded ends of the arms 33ª have reached the limit of their movement, as will be determined by the engagement thereof with the inner circumferential face of the lock plate 20. When the parts are at rest, the springs 21 only move the plate 19 to a releasing position.

As the discs 13 and 17 wear, it becomes necessary to readjust the initial position of the lock plates 20 owing to the fixed range of movement of the bell crank levers 33. This adjustment is effected by means of the rings 26 which are rotated in the correct direction to axially move the lock plates 20. During each of these movements, owing to the continuous pressure exerted by the springs 21, the rounded heads of the pins 24 will ride out of the depressions 23 and into and out of succeeding depressions until said ring has reached the determined position. Except during these periods of adjustment, the lock plate 20 functions as the fixed base for the springs 21 and serves, owing to the pressure of said springs and the seating of the pins 24 in the several depressions 23, to effectually lock the adjusting ring 26 in any desired position and this adjustment is maintained regardless of the reversing or change speed movement of the clutch mechanism, which might otherwise tend to shift the ring 26 from its adjusted position owing to the effect of inertia or momentum of the parts. This resilient holding of the lock plate 20 against the adjusting ring 26 is deemed to be one of the important features of the invention, as well as is the manner of clamping the friction discs in driving engagement by the use of members operating on the principle of the wedge. As a further feature of the construction, it may be noted that the springs 21 serve the dual purpose of separating and holding the floating and lock plates apart, as well as maintaining through the lock plates the adjusted position of the adjusting ring 26. In driving position, the pressure exerted against the slides 30 by the arms 33ª is normal to the direction of movement of the slide, so that the springs 21 do not tend to move the slides in a releasing direction.

The modification shown in Fig. 4 is substantially identical with each of the structures shown in Fig. 1, but in this instance, the clutch is only arranged for driving in one direction, or at one speed. The details of construction and the nature of the operation is the same as that heretofore described for the arrangement shown in Fig. 1.

While I have shown one set of elements and combinations thereof for effectuating my improved clutch construction, it will be understood that the same is intended for a purpose of illustration only and in nowise to restrict my device to the exact forms and structures shown, for many changes may be made therein without departing from the spirit of my invention.

I claim:

1. In a clutch, the combination of friction members attachable to separate rotary parts and adapted for driving engagement with each other, a pair of clamping rings held against relative rotation for effecting said engagement, springs interposed between said rings for retracting the same to a released position, bell crank levers having one arm on each engageable with one of said rings to limit its releasing movement and actuate the same, an adjusting ring contacting the other of said clamping rings for determining the maximum distance between said clamping rings, said springs maintaining the engagement of said adjusting and clamping rings at all times, means for preventing rotation of said adjusting ring relative to its coacting clamping ring comprising pins having rounded heads projecting from the face of said adjusting ring and seated within depressions formed in the abutting face of said clamping ring, slides each having a wedge-shaped end for actuating the other arms of said levers, and a shiftable collar for operating said slides.

2. In a clutch, the combination of friction members attachable to a rotary part, a shaft comprising a second rotary part, a hub on said shaft, friction members on said hub held against rotation relative thereto, both sets of said friction members being adapted for engagement for effecting a power transmission between said parts, a pair of clamping rings held against relative rotation for effecting said engagement, springs interposed between said rings for retracting the same to a released position, lever means having one arm on each engageable with one of said rings for actuating the same, an adjusting ring threaded on said hub for contact with the other of said clamping rings for determining the maximum distance between said clamping rings, said springs maintaining the engagement of said adjusting and clamping rings at all times, means for preventing rotation of said adjusting ring relative to its coacting clamping ring comprising pins having rounded heads projecting from the face of said adjusting ring and seated within depressions formed in the abutting face of said clamping ring, slides on said hub for actuating the other arms of said levers, and a shiftable collar for operating said slides.

3. In a clutch, the combination of friction members attachable to separate rotary parts and adapted for driving engagement with each other, a pair of clamping rings held against relative rotation for effecting said engagement, springs interposed between said rings for retracting the same to a released position, lever means having one arm on each engageable with one of said rings for actuating the same, the other arms of said lever means extending interiorly of the friction members, an adjusting ring contacting the other of said clamping rings for determining the maximum distance between said clamping rings, slides shiftable interiorly of said friction members for actuating the other arms of said lever means, and means for operating said slides.

4. In a clutch, the combination of friction members attachable to separate rotary parts and adapted for driving engagement with each other, a pair of clamping rings held against relative rotation for effecting said engagement, springs interposed between said rings for retracting the same to a released position, lever means having one arm on each engageable with one of said rings for actuating the same, the other arms of said lever means extending interiorly of the friction members, an adjusting ring contacting the other of said clamping rings for determining the maximum distance between said clamping rings, means for preventing rotation of said adjusting ring relative to its coacting clamping ring, slides shiftable interiorly of said friction members for actuating the other arms of said lever means, and means for operating said slides.

5. In a clutch, the combination of friction members attachable to separate rotary parts and adapted for driving engagement with each other, a pair of clamping rings held against relative rotation for effecting said engagement, springs interposed between said rings for retracting the same to a released position, lever means having one arm on each engageable with one of said rings for actuating the same, an adjusting ring contacting the other of said clamping rings for determining the maximum distance between said clamping rings, means for preventing rotation of said adjusting ring relative to its coacting clamping ring comprising pins having rounded heads projecting from the face of said adjusting ring and seated within depressions formed in the abutting face of said clamping ring, slides for actuating the other arms of said levers, and means for operating said slides.

6. In a clutch, the combination of friction members attachable to separate rotary parts and adapted for driving engagement with each other, a pair of clamping rings held against relative rotation for effecting said engagement, springs interposed between said rings for retracting the same to a released position, lever means having one arm on each engageable with one of said rings to actuate the same, the other arms of said lever means extending interiorly of the friction members, slides shiftable interiorly of said friction members for actuating the other arms of said lever means, and means for operating said slides, the relation of the arms of said lever means being such that the pressure of said springs, when the clutch is in driving position, causes a pressure of the lever arms coacting with said slides in directions substantially normal to the actuating movements thereof.

7. In a clutch, the combination of friction members attachable to separate rotary parts and adapted for driving engagement with each other, a pair of clamping rings held against relative rotation for effecting said engagement, springs interposed between said rings for retracting the same to a released position, bell crank levers having one arm on each engageable with one of said rings to limit its releasing movement, an adjusting ring contacting the other of said clamping rings for determining the maximum distance between said clamping rings, said springs maintaining the engagement of said adjusting and clamping rings at all times, slides each having a wedge-shaped end for actuating the other arms of said levers, and a shiftable collar encircling said slides for retaining the same in position and for operating the same.

8. In a clutch, the combination of friction members attachable to separate rotary parts and adapted for driving engagement with each other, a pair of clamping rings held against relative rotation for effecting said engagement, springs interposed between said rings for retracting the same to a released position, lever means having one arm on each engageable with one of said rings for actuating the same, the other arms of said lever means extending interiorly of the friction members, an adjusting ring contacting the other of said clamping rings for determining the maximum distance between said clamping rings, slides shiftable between the inner peripheries of said friction members and said other arms for actuating said lever means to close the clutch, and means for operating said slides.

9. In a clutch, the combination of friction members attachable to separate rotary parts and adapted for driving engagement with each other, a pair of clamping rings held against relative rotation for effecting said engagement, springs interposed between said rings for retracting the same to a released position, lever means having one arm on each engageable with one of said rings to actuate the same, the other arms extending interiorly of said friction members for limiting contact with the inner periphery of the other clamping ring when the lever means are released, an adjusting ring contacting said other clamping ring for determining the maximum distance between said clamping rings, slides shiftable between the inner peripheries of said friction members and said interiorly extending arms of the lever means for actuating said last named arms to close the clutch, and means for operating said slides.

WILLIAM J. PEARMAIN.